US012705394B2

(12) United States Patent
Reid

(10) Patent No.: US 12,705,394 B2
(45) Date of Patent: Aug. 11, 2026

(54) MACHINE LEARNING DATA ANONYMIZER

(71) Applicant: TIFIN Group, LLC, Boulder, CO (US)

(72) Inventor: Sarah Reid, Redmond, WA (US)

(73) Assignee: TIFIN Group, LLC, Boulder, CO (US)

( * ) Notice: Subject to any disclaimer, the term of this patent is extended or adjusted under 35 U.S.C. 154(b) by 0 days.

(21) Appl. No.: 18/755,558

(22) Filed: Jun. 26, 2024

(65) Prior Publication Data

US 2026/0004002 A1 Jan. 1, 2026

(51) Int. Cl.
*G06F 21/62* (2013.01)

(52) U.S. Cl.
CPC ................................ *G06F 21/6254* (2013.01)

(58) Field of Classification Search
CPC .................................................. G06F 21/6254
See application file for complete search history.

(56) References Cited

U.S. PATENT DOCUMENTS 12,361,220 B1 * 7/2025 Krull ..................... G06F 40/295
12,373,897 B1 * 7/2025 Tran ...................... G06F 40/295
12,399,924 B1 * 8/2025 Iyer ..................... G06F 16/3344
12,406,084 B1 * 9/2025 Krull ................... G06F 21/6227
12,412,669 B1 * 9/2025 Jackson ................. G16H 50/70
12,417,317 B1 * 9/2025 LaFever .............. G06F 21/6254
12,417,464 B2 * 9/2025 Cella ................ G06Q 10/06315
2017/0098093 A1 * 4/2017 Koo .................... G06F 21/6209
2020/0334381 A1 10/2020 Yarowsky et al.
2022/0050921 A1 * 2/2022 LaFever ................. G16H 10/60
2023/0195933 A1 * 6/2023 Satish Padmanabhan ................. G06F 40/263 726/26
2025/0225012 A1 * 7/2025 Turner ..................... G06N 3/09
2025/0225155 A1 * 7/2025 Smith ................... G06F 16/287
2025/0225326 A1 * 7/2025 Harnish .............. G06F 16/3344
2025/0225336 A1 * 7/2025 Harnish ............... G06Q 20/405
2025/0225420 A1 * 7/2025 Smith ..................... H04L 51/02
(Continued)

FOREIGN PATENT DOCUMENTS

IN 202311062261 10/2023

OTHER PUBLICATIONS

International Search Report and Written Opinion received for PCT Patent Application No. PCT/US2025/035463, mailed on Sep. 15, 2025, 8 pages.

*Primary Examiner* — Stephen T Gundry

(57) ABSTRACT

Aspects of the present disclosure relate to a machine learning data anonymizer. To anonymize data that is provided for third party processing, sensitive entities are identified therein, which are replaced with replacement entities accordingly. In examples, the replacement entities include an indication of a category corresponding to the sensitive entity, thereby retaining a context/semantic meaning of the sensitive entity without providing the sensitive entity itself. A mapping is generated that associates replacement entities and corresponding sensitive entities, thereby facilitating subsequent deanonymization. Once generated output is received from the third party (e.g., as may have been generated by a machine learning model), the generative output is processed according to the mapping to substitute replacement entities therein with corresponding sensitive entities, thereby generating deanonymized model output in which sensitive entities are reintroduced and thus available for subsequent processing.

20 Claims, 6 Drawing Sheets

(56) References Cited

U.S. PATENT DOCUMENTS

2025/0244967 A1* 7/2025 Meerasankaranarayanan ............. G06F 8/35
2025/0258935 A1* 8/2025 Shintani .............. G06F 21/6245
2025/0272358 A1* 8/2025 Powell .................... G06F 18/22
2025/0274353 A1* 8/2025 Smith ....................... H04L 9/32
2025/0284846 A1* 9/2025 Dhaliwal ............ G06F 21/6254
2025/0285130 A1* 9/2025 Smith ................ G06Q 30/0202
2025/0291953 A1* 9/2025 Malaby ............... G06F 21/6254

* cited by examiner

MACHINE LEARNING DATA ANONYMIZER

BACKGROUND

In examples, machine learning processing is performed using a third-party platform or library, among other examples. However, the data may include sensitive information, such that it is preferable to avoid or reduce the extent to which such sensitive information is provided for processing by the third party.

Additionally, traditional redaction techniques may be inapplicable, may have reduced effectiveness, and/or may limit the utility of processing performed by the third party, especially in instances where the sensitive information provides context and/or semantic meaning that would aid the machine learning processing.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to a machine learning data anonymizer. In examples, data that includes sensitive information is anonymized, such that the anonymized data is provided to a third party for machine learning processing, thereby reducing instances where sensitive information is provided to the third party.

To anonymize the data, one or more sensitive entities are identified therein, which are replaced with replacement entities accordingly. In examples, the replacement entities include an indication of a category corresponding to the sensitive entity, thereby retaining a context and/or semantic meaning associated with the sensitive entity without providing the sensitive entity itself. A mapping is generated that associates replacement entities and corresponding sensitive entities, thereby facilitating subsequent deanonymization.

Once generated output is received from the third party (e.g., as may have been generated by a machine learning model), the generative output is processed according to the mapping to substitute replacement entities therein with corresponding sensitive entities, thereby generating deanonymized model output in which sensitive entities are reintroduced and thus available for subsequent processing.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
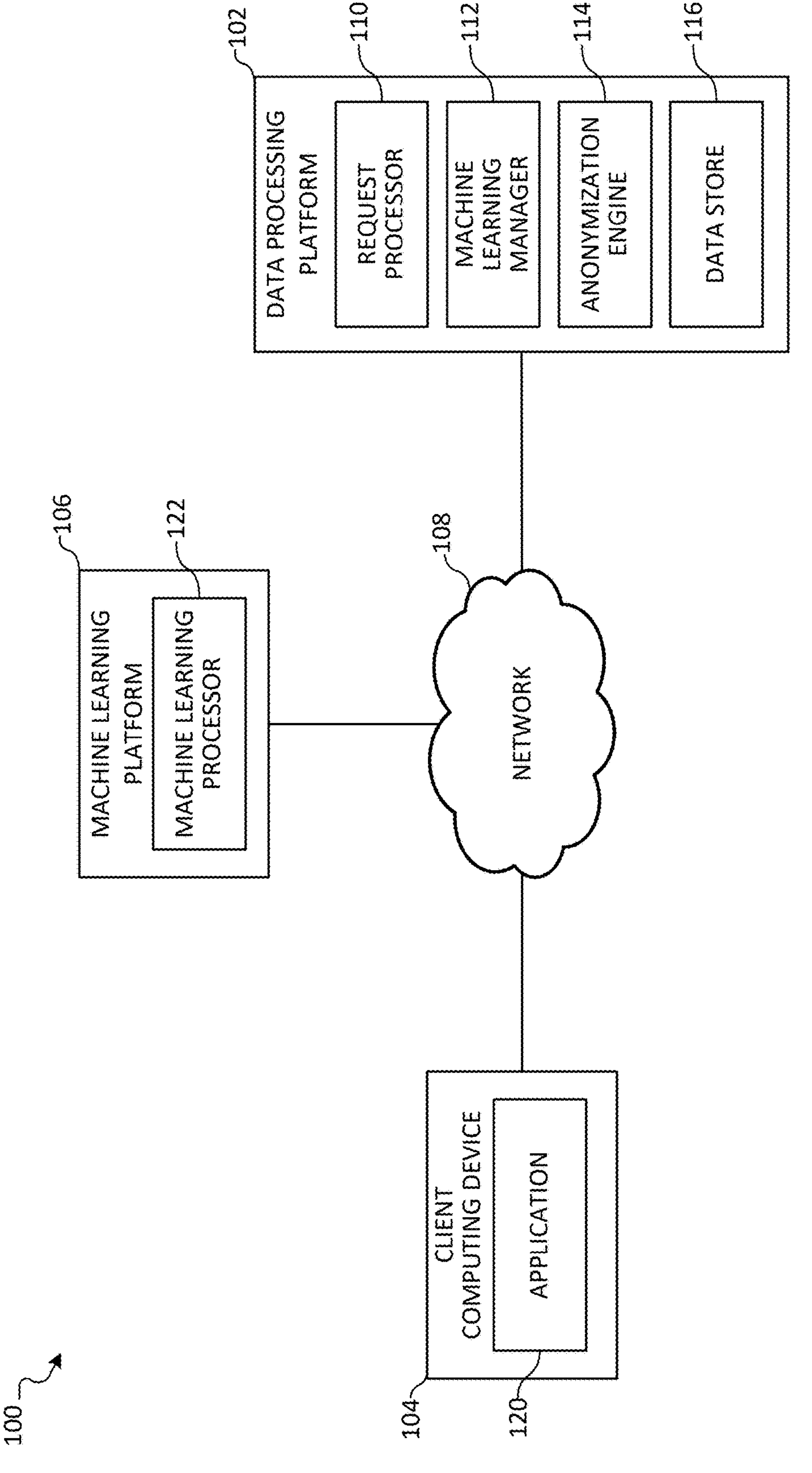
FIG. 1 illustrates an overview of an example system for data anonymization for machine learning processing according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a machine learning (ML) model is used to process data, for example to produce generative model output and/or to re-rank items within data, among other examples. For example, a generative model may be used to generate any of a variety of output types. Example ML models include, but are not limited to, Generative Pretrained Transformer 4 (GPT-4), BigScience Large Open-science Open-access Multilingual Language Model (BLOOM), DALL-E, or Jukebox.

While machine learning processing may be performed by a first-party computing device in some instances, there may be other instances where data is instead provided for processing by a third party (e.g., a machine learning service or using a third-party machine learning library). However, the data may include sensitive information (also referred to herein as one or more "sensitive entities"), such that it may be preferable to avoid or reduce instances where such sensitive information is provided to the third party as part of the data provided for processing. Example sensitive information includes, but is not limited to, personal information (e.g., a name, an address, contact information, a Social Security number, etc.), financial information (e.g., an account number, a balance, a credit score, etc.), and/or medical information, among other examples.

Additionally, given processing performed by an ML model may be reliant on the context and/or semantic meaning that would otherwise be conferred by such sensitive entities, traditional techniques for protecting sensitive information (e.g., by redaction/omission) may negatively affect the output generated by an ML model. Further, while replacing sensitive information with "fake" (e.g., random) information may protect the sensitive information and still confer some meaning to an ML model, such anonymization techniques may not result in model output that reliably includes the fake information, thereby making it difficult or impossible to reverse the anonymization for subsequent processing of the model output.

Accordingly, aspects of the present disclosure relate to a machine learning data anonymizer, in which sensitive entities are each identified and replaced with a corresponding replacement entity to produce anonymized data for processing by an ML model. In examples, each replacement entity retains a semantic and/or contextual meaning (among other examples) of the corresponding sensitive entity, thereby improving the ability of an ML model to process the anonymized data based on such context/semantic meanings (e.g., as compared to redaction).

Additionally, as compared to anonymization techniques in which fake information is used to replace sensitive information, use of replacement entities according to aspects of the present disclosure may induce an ML model to include or otherwise retain such replacement entities within model output that is generated by the ML model, thereby facilitating reversal of the anonymization process with respect to the generated model output. For instance, to perform subsequent processing using model output from an ML model, a mapping between replacement entities and sensitive entities is used to identify replacement entities within the model output, such that they are replaced with corresponding sensitive entities accordingly.

Thus, the disclosed aspects permit data to be anonymized prior to providing the data to a third party, and further permit deanonymization of the data upon receipt of a processing result (e.g., model output) from the third party. As a result of performing such processing, the first party not only retains control of sensitive information, but may also be able to perform such processing with reduced latency (e.g., as compared to using an anonymization service) and to tune the detection of sensitive entities according to one or more specific contexts, among other examples.

For instance, reduced latency may be beneficial in a variety of contexts, including instances where ML processing is applied in a conversational context (e.g., based on natural language input from a user). Additionally, tuning sensitive entity identification may permit third-party ML processing of data that would not otherwise be possible (e.g., as a result of incorrect or otherwise failed identification of sensitive entities therein) and/or may improve the speed with which data is processed (e.g., as a result of avoiding the detection of entities that would otherwise be identified as sensitive, as different contexts may have different associated sensitive entities), among other examples.

FIG. 1 illustrates an overview of an example system 100 for data anonymization for machine learning processing according to aspects described herein. As illustrated, system 100 comprises data processing platform 102, client computing device 104, machine learning platform 106, and network 108. In examples, data processing platform 102, client computing device 104, and machine learning platform 106 communicate via network 108. For example, network 108 may comprise a local area network, a wireless network, or the Internet, or any combination thereof, among other examples.

Client computing device 104 may each be any of a variety of computing devices, including, but not limited to, a desktop computing device, a laptop computing device, a tablet computing device, or a mobile computing device, among other examples. As illustrated, client computing device 104 includes application 120, which may communicate with data processing platform 102. As an example, a user of client computing device 104 operates application 120 to access functionality of data processing platform 102, such that computing device 104 generates a request (e.g., as may be processed by request processor 110) for which a response is received from data processing platform 102 accordingly.

In the present example, application 120 may access functionality of data processing platform 102. For instance, application 120 may be provided by data processing platform 102 or, as another example, application 120 may be a web browser used to access a website of data processing platform 102, such that the associated processing may thus be first-party processing. As an example, the user provides natural language input via application 120, which is processed by data processing platform 102. In a further example, data processing platform 102 requests processing by machine learning platform 106 (e.g., via machine learning manager 112), which may thus constitute third-party processing according to aspects described herein.

Machine learning platform 106 includes machine learning processor 122, which may perform any of a variety of machine learning processing. For example, machine learning platform 106 includes a generative machine learning model, such that processing by machine learning processor 122 comprises processing data to produce generative output accordingly. In such an example, the data may comprise a prompt, context, and/or short-term memory associated with the requested processing. While examples of machine learning processing are described, it will be appreciated that similar techniques may be used to anonymize data for any of a variety of alternative or additional machine learning processing according to aspects described herein.

Additionally, while the present example depicts example client/server interactions (e.g., between application 120 and data processing platform 102, and between machine learning manager 112 and machine learning platform 106), it will be appreciated that any of a variety of other third-party processing may be addressed by the disclosed aspects in other examples. For instance, while data processing platform 102 is illustrated as including anonymization engine 114, client computing device 104 may additionally or alternatively include such aspects with which data is anonymized prior to transmission to machine learning platform 106. As another example, client computing device 104 includes a third-party ML library (e.g., as may be used by application 120, which may be associated with machine learning platform 106), such that data is anonymized according to aspects of the present disclosure prior to processing by the ML library.

As illustrated, data processing platform 102 includes request processor 110, machine learning manager 112, anonymization engine 114, and data store 116. As noted above, request processor 110 processes client requests (e.g., from application 120 of client computing device 104). It will be appreciated that any of a variety of processing may be performed by request processor 110, such as accessing data associated with a user of client computing device 104 (e.g., from data store 116), processing data received from client computing device 104 (e.g., as may include user input, such as natural language input), providing data for processing by machine learning platform 106 (e.g., via machine learning manager 112), and/or processing model output generated by machine learning platform 106, among other examples.

Machine learning manager 112 manages machine learning processing as may be performed by data processing platform 102 and/or as may be performed using machine learning platform 106. For instance, machine learning manager 112 communicates with machine learning platform 106 according to an application programming interface (API) provided by machine learning platform 106. For instance, the API is used to provide data for processing, such that machine learning processor 122 processes the data and generates model output accordingly, which is obtained by machine learning manager 112 accordingly.

Data processing platform 102 further includes anonymization engine 114, which processes data prior to third-party processing (e.g., by machine learning platform 106), thereby generating anonymized data, and processes data after third-party processing (e.g., model output of machine learning processor 122), thereby generating deanonymized model output. In examples, data for anonymization is received by anonymization engine 114 from request processor 110, and deanonymized model output is provided by anonymization engine 114 to request processor 110 for subsequent processing. Thus, anonymization engine 114 enables the use of third-party processing (e.g., as part of processing performed by request processor 110) for data that includes sensitive information without permitting the third party to access the sensitive information itself. Additional aspects of anonymization engine 114 are discussed below with respect to FIGS. 2, 3, 4, and 5.

While system 100 is illustrated as comprising a single data processing platform 102, a client computing device 104, and a single machine learning platform 106, it will be appreciated that, in other examples, any number of such elements may be used. Further, it will be appreciated that functionality described above with respect to specific elements of system 100 may be distributed according to any of a variety of other paradigms in other examples. For example, third-party processing may be performed local to data processing platform 102 and/or client computing device 104, among other examples.

Figure 2:
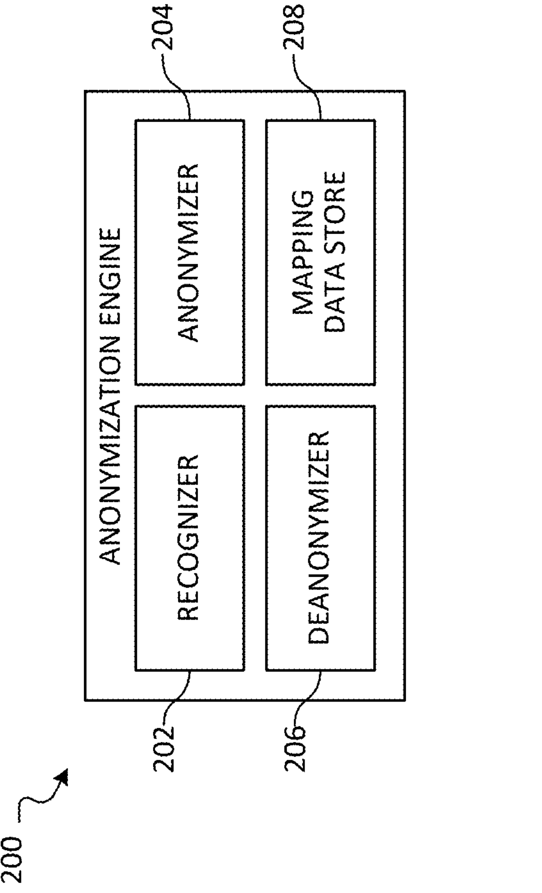
FIG. 2 illustrates an overview of an example anonymization engine according to aspects described herein.

FIG. 2 illustrates an overview of example anonymization engine 200 according to aspects described herein. Aspects of anonymization engine 200 may be similar to those discussed above with respect to anonymization engine 114 of FIG. 1 and are therefore not necessarily redescribed in detail.

As illustrated, anonymization engine 200 includes recognizer 202, anonymizer 204, deanonymizer 206, and mapping data store 208. Recognizer 202 processes data (e.g., as may be received from a request processor, such as request processor 110 in FIG. 1) to identify sensitive entities therein. For example, a set of patterns is used to process the data to identify one or more matching sensitive entities. In examples, pattern matching is used to identify sensitive information that follows a known structure, including, but not limited to, an email address, a Social Security number, a phone number, and/or a credit card number, among other examples.

However, some sensitive information may not be as structured and/or consistent, such that pattern matching may be less effective or ineffective for identifying such entities. Accordingly, named-entity recognition may additionally or alternatively be used to identify entities according to aspects described herein. As an example, natural language processing is used to tag one or more sensitive entities. As another example, a model is trained (e.g., using annotated training data) to identify sensitive entities accordingly. In such an example, the model may be trained based on data associated with a context for which the model will be used to identify sensitive entities, thereby enabling recognizer 202 to anonymize sensitive information associated with a given context.

As an example, annotated financial data may be used to train a model to identify sensitive financial information accordingly. Examples include, but are not limited to, account numbers, account balances, and/or percentages, among other examples. As a further example, annotated log data may be used to train a model to identify sensitive information within software logs accordingly, thereby enabling third-party processing of log information generated by one or more associated applications without providing sensitive information therein to the third party. In another example, annotated enterprise documents (e.g., emails, word processing documents, spreadsheets, etc.) may be used (e.g., for a given company or business unit), thereby permitting the identification of sensitive information therein according to aspects described herein. It will therefore be appreciated that a named-entity recognition model may be trained for any of a variety of specific contexts.

It will be appreciated that multiple models may be used (e.g., wherein each model has an associated set of sensitive entities that the model was trained to recognize). In some instances, a combination of off-the-shelf (e.g., pre-trained) models and custom models are used. For instance, an off-the-shelf model may be used to recognize more common sensitive information, whereas a custom model may be used to recognize context-specific sensitive information. As noted above, such aspects thus permit anonymization of sensitive information for a specific context in addition to or as an alternative to more common sensitive information (email addresses, phone numbers, and/or Social Security numbers).

Anonymization engine 200 further comprises anonymizer 204. In examples, anonymizer 204 processes an identified set of sensitive entities (e.g., as may have been identified by recognizer 202) and replaces each instance (e.g., occurrence) of an identified sensitive entity with a corresponding replacement entity.

Anonymizer 204 may generate replacement entities according to any of a variety of techniques. In examples, an identified sensitive entity has an associated category (e.g., as may have been generated as part of the processing performed by recognizer 202 and/or as may be determined by anonymizer 204). Accordingly, anonymizer 204 generates a replacement entity based on the associated category, such that the replacement entity includes an indication of the associated category (e.g., a category name and/or a category description). In examples, the replacement entity is structured such that it is apparent that it represents a discrete entity (e.g., using underscores, brackets, capitalized letters, camel-case letters, etc.), rather than potentially introducing ambiguity/confusion within the anonymized data. As a result of including an indication of the associated category in the replacement entity, context/semantic meaning corresponding to the sensitive entity is retained at least in part, thereby facilitating improved processing by an ML model.

In examples, the replacement entity includes an identifier (e.g., as may be prepended or appended to the category indication), such that each different sensitive entity within the same associated category remains distinct. For instance, if there are two different phone numbers that are identified as sensitive entities (e.g., within a "phone number" category), the replacement entity for the first phone number may include an identifier of "1" (e.g., "PHONE_NUMBER_1" or "PhoneNumber1"), while the replacement entity for the second phone number may include an identifier of "2" (e.g., "PHONE_NUMBER_2" or "PhoneNumber2"). Multiple instances of the same sensitive entity may thus be replaced using the same replacement entity according to aspects described herein.

Anonymizer 204 generates a mapping within mapping data store 208 that associates replacement entities and sensitive entities, thereby enabling deanonymization (e.g., of model output) according to aspects described herein.

Accordingly, deanonymizer 206 processes data comprising one or more replacement entities (e.g., model output from a machine learning platform) according to a mapping from mapping data store 208. Deanonymizer 206 identifies replacement entities and replaces each instance of an identified replacement entity with an associated sensitive entity (e.g., as indicated by the mapping).

As noted above, data processed by a machine learning model may include a prompt, context, and/or short-term memory. Anonymization performed according to aspects described herein (e.g., by recognizer 202 and anonymizer 204) may thus process the prompt, context, and/or short-term memory together, such that sensitive entities therein are replaced with consistent replacement entities (e.g., the same replacement entity is used for multiple instances of the same sensitive entity).

In examples, the disclosed aspects anonymize/deanonymize each exchange with a machine learning platform (e.g., anonymizing the request and deanonymizing the resulting model output). In such examples, the set of replacement entities (and thus the mapping within mapping data store 208) is generated for each request, rather than reusing a set of entities for multiple requests. In other examples, a mapping is retained for multiple requests. In such examples, at least a part of the data may be pre-anonymized, as may be the case for context data and/or a short-term memory, among other examples.

Figure 3:
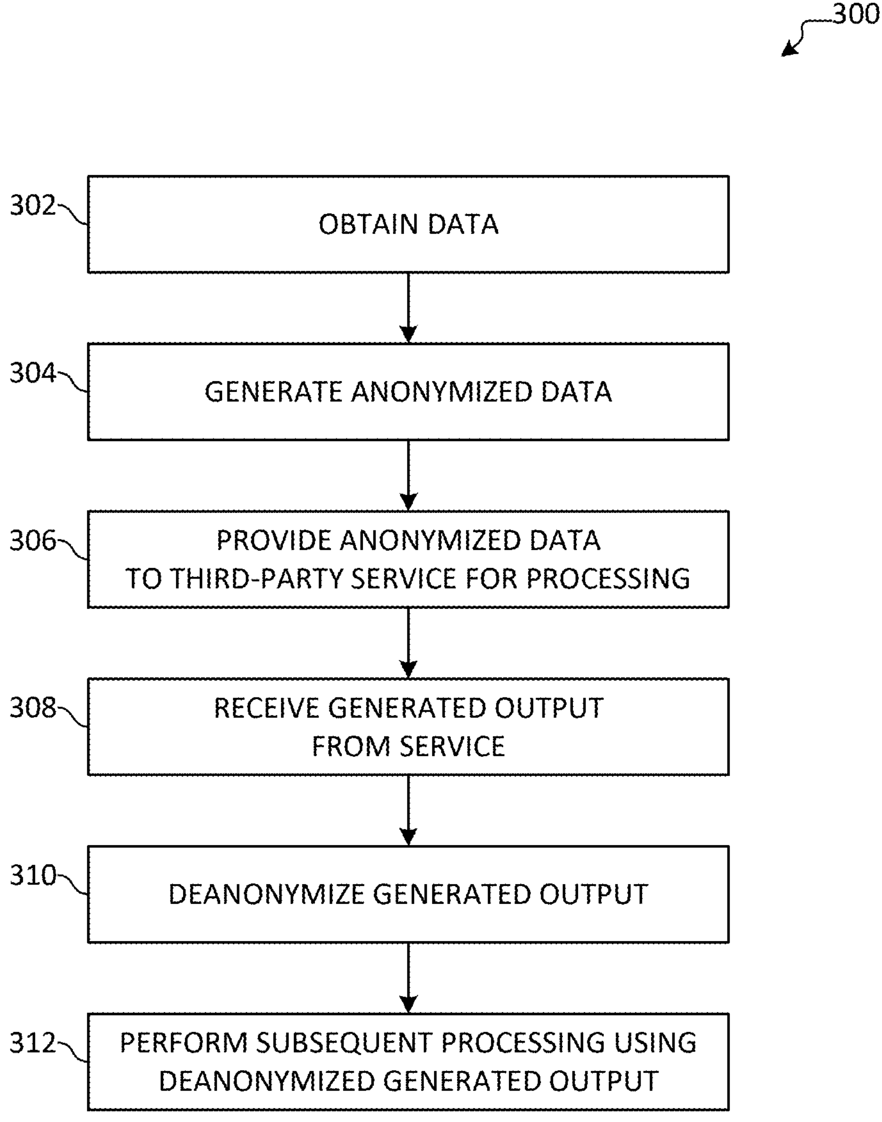
FIG. 3 illustrates an overview of an example method for data anonymization for machine learning processing according to aspects described herein.

FIG. 3 illustrates an overview of an example method 300 for data anonymization for machine learning processing according to aspects described herein. In examples, aspects of method 300 are performed by a data processing platform, such as data processing platform 102 in FIG. 1.

As illustrated, method 300 begins at operation 302, where data is obtained. In examples, the data is obtained from a user (e.g., of a client computing device, such as client computing device 104 in FIG. 1) and/or from a data store (e.g., data store 116), among other examples. The data may include natural language input. In examples, the obtained data includes one or more instances of sensitive information, such that the sensitive information is anonymized prior to processing by a third party (e.g., machine learning platform 106 in FIG. 1).

Flow progresses to operation 304, where anonymized data is generated based on the obtained data. In examples, aspects of operation 304 are performed by an anonymization engine, such as anonymization engine 114 or anonymization engine 200 in FIGS. 1 and 2, respectively. As discussed above, generating anonymized data may comprise identifying instances of one or more sensitive entities therein (e.g., by recognizer 202 in FIG. 2) and replacing the identified instances with a corresponding replacement entity (e.g., by anonymizer 204). Additional examples of such aspects are discussed below with respect to FIG. 4.

Moving to operation 306, the anonymized data is provided to a third-party service for subsequent processing. In examples, the anonymized data is provided via an API of the third-party service (e.g., by a machine learning manager, such as machine learning manager 112 discussed above with respect to FIG. 1). While method 300 is described as an example in which a client/server interaction is used to communicate with the third-party service, it will be appreciated that similar aspects may be used in instances where a third-party library is used (e.g., locally), among other examples.

At operation 308, generated output is received from the service. As noted above, the reference entities with which the sensitive entities are replaced may induce an ML model to include one or more such reference entities within the generated output. Thus, the received generated output may still be anonymized generated output according to aspects described herein.

Accordingly, at operation 310, the generated output is deanonymized. In examples, aspects of operation 310 are performed by an anonymization engine, such as anonymization engine 114 or anonymization engine 200 in FIGS. 1 and 2, respectively. For instance, deanonymizer 206 in FIG. 2 uses a mapping of mapping data store 208 to identify and replace entities within the generated output with associated sensitive entities according to aspects described herein. Additional examples of such aspects are discussed below with respect to FIG. 5.

Flow progresses to operation 312, where subsequent processing is performed using the resulting deanonymized generated output. For example, at least a part of the deanonymized generated output may be presented to a user (e.g., of a user computing device) and/or a request processor (e.g., request processor 110 in FIG. 1) further processes the deanonymized generated output to generate a response to a request by the user computing device, among other examples. As illustrated, method 300 terminates at operation 312.

Figure 4:
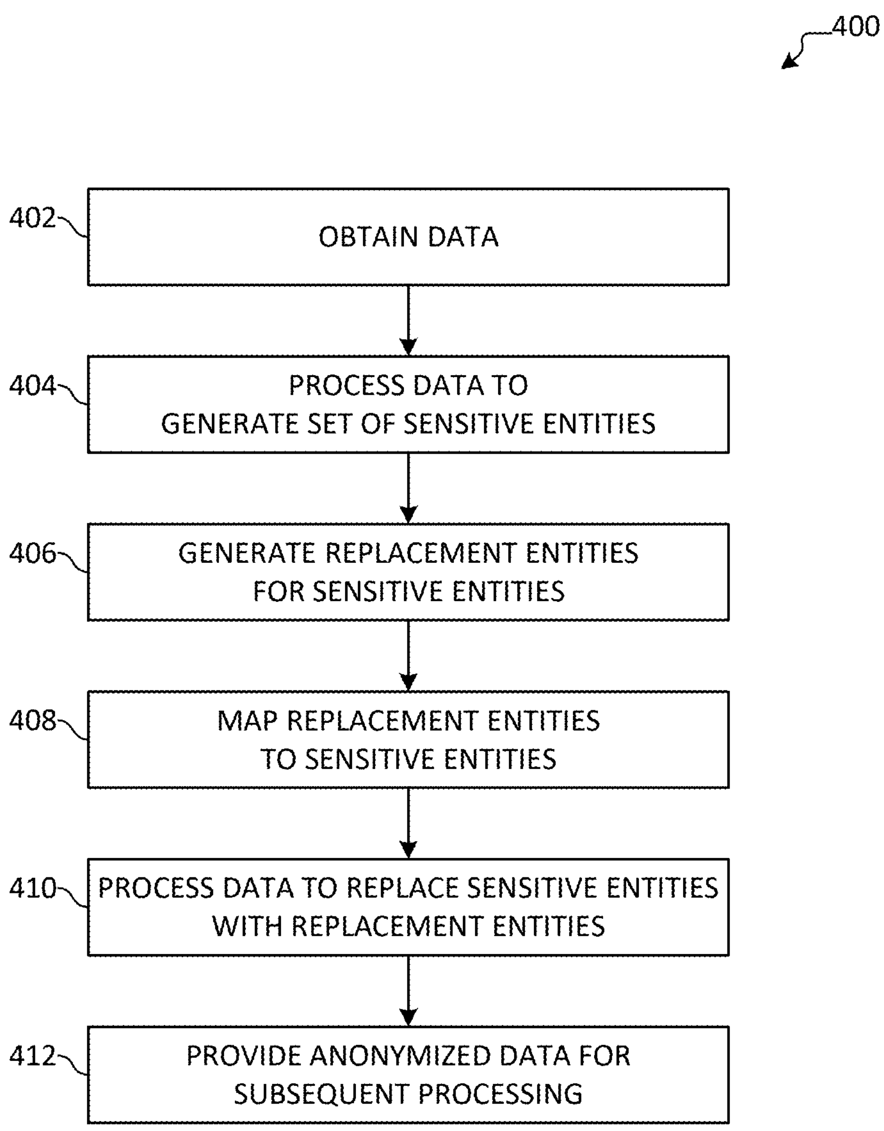
FIG. 4 illustrates an overview of an example method for processing data to generate anonymized data according to aspects described herein.

FIG. 4 illustrates an overview of an example method 400 for processing data to generate anonymized data according to aspects described herein. In examples, aspects of method 400 are performed by a data processing platform, such as data processing platform 102 in FIG. 1. For instance, anonymization engine 114 and/or anonymization engine 200 in FIGS. 1 and 2, respectively, may perform such aspects.

As illustrated, method 400 begins at operation 402, where data is obtained. For instance, the data is obtained from a request processor (e.g., request processor 110) performing aspects of operation 304 discussed above with respect to method 300 of FIG. 3. As noted above, the data may include natural language input, among other examples.

Flow progresses to operation 404, where the data is processed to generate a set of sensitive entities. Aspects of operation 404 may be performed by recognizer 202 discussed above with respect to FIG. 2. For example, the obtained data may be processed using one or more patterns and/or named-entity recognition models to identify one or more sensitive entities therein. While example identification techniques are described, it will be appreciated that any of a variety of additional or alternative identification techniques may be used in other examples.

At operation 406, a replacement entity is generated for each of the sensitive entities. In examples, aspects of operation 406 are performed by an anonymizer, such as anonymizer 204 discussed above with respect to FIG. 2. In examples, operation 406 comprises generating a replacement entity that comprises an indication of a category associated with a sensitive entity. In some examples, an identifier is included within the generated replacement entity, as may be the case when there are multiple different sensitive entities of the same category. While example replacement entity formats are described (e.g., including a category indication and an identifier), it will be appreciated that any of a variety of other formats may be used in other examples.

Flow progresses to operation 408, where each replacement entity is mapped to a corresponding sensitive entity. Aspects of operation 408 may be performed by an anonymizer, such as anonymizer 204 discussed above with respect to FIG. 2. In examples, the mapping is generated within a mapping data store, such as mapping data store 208 in FIG. 2. As noted above, such a mapping may be used for a single exchange with a third-party service or may be retained for multiple such exchanges, among other examples.

At operation 410, the obtained data is processed to replace sensitive entities therein with the corresponding replacement entities that were generated at operation 406. In examples, multiple instances of a given sensitive entity are replaced with the same replacement entity. Aspects of operation 410 may be performed by an anonymizer, such as anonymizer 204 discussed above with respect to FIG. 2.

Moving to operation 412, the resulting anonymized data is provided for subsequent processing. For example, the anonymized data is provided for subsequent transmission to a machine learning platform and/or for processing by a third-party library, among other examples. Thus, it will be appreciated that any of a variety of subsequent processing may be performed using the anonymized data according to aspects described herein. As illustrated, method 400 terminates at operation 412.

Figure 5:
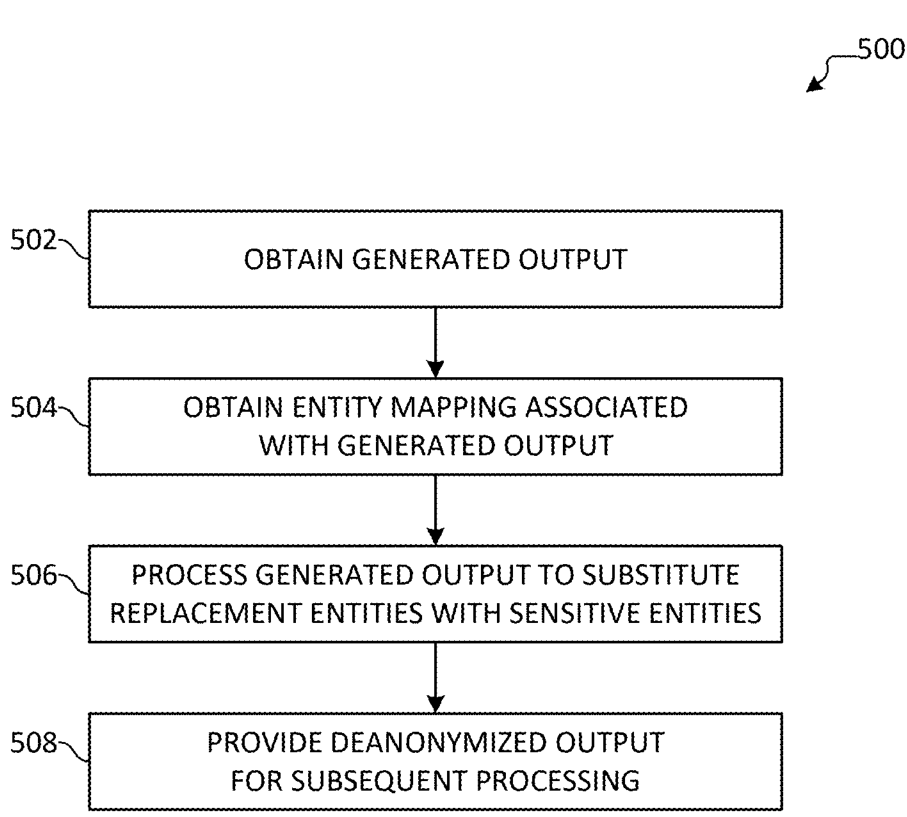
FIG. 5 illustrates an overview of an example method for deanonymizing data after it has been processed (e.g., by a third party) according to aspects described herein.

FIG. 5 illustrates an overview of an example method 500 for deanonymizing data after it has been processed (e.g., by a third party) according to aspects described herein. In examples, aspects of method 500 are performed by a data processing platform, such as data processing platform 102 in FIG. 1. For instance, anonymization engine 114 and/or anonymization engine 200 in FIGS. 1 and 2, respectively, may perform such aspects.

As illustrated, method 500 begins at operation 502, where generated output is obtained. In examples, the generated output is obtained from a machine learning platform, such as machine learning platform 106 discussed above with respect to FIG. 1. Aspects of operation 502 may be similar to those discussed above with respect to operation 308 of method 300 in FIG. 3 and are therefore not necessarily redescribed in detail.

Flow progresses to operation 504, where an entity mapping associated with the generated output is obtained. In examples, the mapping is obtained from a mapping data store, such as mapping data store 208 in FIG. 2. Accordingly, at operation 506, the generated output that was obtained at operation 502 is processed according to the obtained mapping to replace replacement entities therein with corresponding sensitive entities, thereby producing deanonymized generated output.

Moving to operation 508, the deanonymized generated output is provided for subsequent processing. Aspects of operation 508 may be similar to those of operation 312 discussed above with respect to method 300 in FIG. 3 and are therefore not necessarily redescribed in detail. For example, the deanonymized generated output may be further processed by a request processor, such as request processor 110 discussed above with respect to FIG. 1. As illustrated, method 500 terminates at operation 508.

Figure 6:
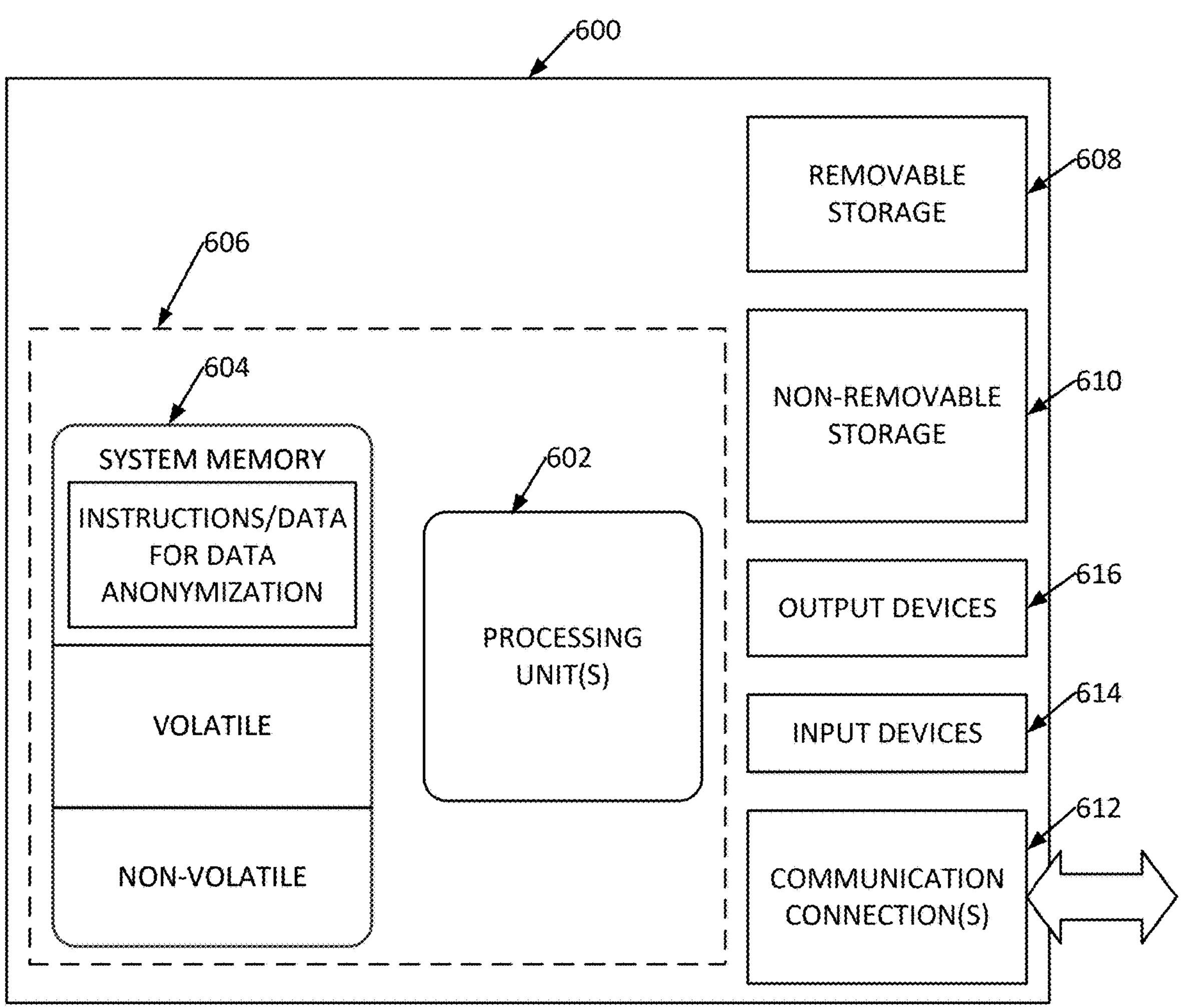
FIG. 6 illustrates an example of a suitable operating environment in which one or more aspects of the present application may be implemented.

FIG. 6 illustrates an example of a suitable operating environment 600 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically may include at least one processing unit 602 and memory 604. Depending on the exact configuration and type of computing device, memory 604 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 6 by dashed line 606. Further, environment 600 may also include storage devices (removable, 608, and/or non-removable, 610) including, but not limited to, magnetic or optical disks or tape. Similarly, environment 600 may also have input device(s) 614 such as a keyboard, mouse, pen, voice input, etc. and/or output device(s) 616 such as a display, speakers, printer, etc. Also included in the environment may be one or more communication connections, 612, such as LAN, WAN, point to point, etc.

Operating environment 600 may include at least some form of computer readable media. The computer readable media may be any available media that can be accessed by processing unit 602 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium, which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 604. While executing on the processing unit 602, program modules (e.g., applications, Input/Output (I/O) management, and other utilities) may perform processes including, but not limited to, one or more of the stages of the operational methods described herein such as the methods described above with respect to FIG. 1, 2, 3, 4, or 5, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 600 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

As will be understood from the foregoing disclosure, one aspect of the technology relates to a system comprising: at least one processor; and memory storing instructions that, when executed by the at least one processor, causes the system to perform a set of operations. The set of operations comprises: processing data to identify a set of sensitive entities; generating, based on the set of sensitive entities, a set of replacement entities; processing the data to replace each sensitive entity of the set of sensitive entities with a corresponding replacement entity of the set of replacement entities, thereby generating anonymized data; requesting, based on the anonymized data, machine learning processing by a third-party service; obtaining, from a third-party service, generated output based on the anonymized data, wherein the generated output comprises a replacement entity of the set of replacement entities; and processing the generated output based on a mapping between the replacement entity and a sensitive entity of the set of sensitive entities to generate deanonymized generated output. In an example, the set of sensitive entities is identified using at least one of pattern matching or named-entity recognition. In another example, the named-entity recognition is performed using a model trained based on annotated training data for a specific context. In a further example, identifying the set of sensitive entities further comprises determining a category associated with a sensitive entity of the set of sensitive entities. In yet another example, the set of replacement entities is generated based on a category associated with each sensitive entity of the set of sensitive entities. In a further still example, the data is obtained from a user computing device; and the set of operations further comprises providing at least a part of the deanonymized generated output to the user computing device. In another example, each replacement entity of the set of replacement entities comprises a category indication and an identifier. In a further example, a first replacement entity of the set of replacement entities comprises a category indication and a first identifier; and a second replacement entity of the set of replacement entities comprises the category indication and a second identifier different than the first identifier.

In another aspect, the technology relates to a method. The method comprises: processing, using a named-entity recognition model trained to identify sensitive entities associated with a specific context, data to identify a set of sensitive entities associated with the context; processing the data to replace each sensitive entity of the set of sensitive entities with a corresponding replacement entity, thereby generating anonymized data, wherein each replacement entity comprises a category indication and an identifier; requesting, based on the anonymized data, machine learning processing by a third-party service; obtaining, from a third-party service, generated output based on the anonymized data; and processing the generated output to replace a replacement entity of the generated output with an associated sensitive entity, thereby generating deanonymized generated output. In an example, the named-entity recognition model is a first named entity recognition model; identifying the set of sensitive entities further comprises processing the data using a second named-entity recognition model. In another example, the data comprises at least one of a prompt, a context, or a short term memory associated with the machine learning processing by the third-party service. In a further example, processing the data to replace each sensitive entity with a corresponding replacement entity comprises: identifying a first instance of a sensitive entity and a second instance of the sensitive entity; and replacing both the first instance and the second instance with a same corresponding replacement entity.

In a further aspect, the technology relates to another method. The method comprises: processing data to identify a set of sensitive entities; generating, based on the set of sensitive entities, a set of replacement entities; processing the data to replace each sensitive entity of the set of sensitive entities with a corresponding replacement entity of the set of replacement entities, thereby generating anonymized data; requesting, based on the anonymized data, machine learning processing by a third-party service; obtaining, from a third-party service, generated output based on the anonymized data, wherein the generated output comprises a replacement entity of the set of replacement entities; and processing the generated output based on a mapping between the replacement entity and a sensitive entity of the set of sensitive entities to generate deanonymized generated output. In an example, the set of sensitive entities is identified using at least one of pattern matching or named-entity recognition. In another example, the named-entity recognition is performed using a model trained based on annotated training data for a specific context. In a further example, identifying the set of sensitive entities further comprises determining a category associated with a sensitive entity of the set of sensitive entities. In yet another example, the set of replacement entities is generated based on a category associated with each sensitive entity of the set of sensitive entities. In a further still example, the data is obtained from a user computing device; and the method further comprises providing at least a part of the deanonymized generated output to the user computing device. In an example, each replacement entity of the set of replacement entities comprises a category indication and an identifier. In another example, a first replacement entity of the set of replacement entities comprises a category indication and a first identifier; and a second replacement entity of the set of replacement entities comprises the category indication and a second identifier different than the first identifier.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:

at least one processor; and memory storing instructions that, when executed by the at least one processor, causes the system to perform a set of operations, the set of operations comprising:

processing data to identify a set of sensitive entities;

generating, based on the set of sensitive entities, a set of replacement entities, wherein the set of replacement entities retains contextual information for the set of sensitive entities;

processing the data to replace each sensitive entity of the set of sensitive entities with a corresponding replacement entity of the set of replacement entities, thereby generating anonymized data;

requesting, based on the anonymized data, machine learning processing by a third-party service;

obtaining, from a third-party service, generated output based on the anonymized data, wherein the generated output comprises a replacement entity of the set of replacement entities; and processing the generated output based on a mapping between the replacement entity and a sensitive entity of the set of sensitive entities to generate deanonymized generated output.

2. The system of claim 1, wherein the set of sensitive entities is identified using at least one of pattern matching or named-entity recognition.

3. The system of claim 2, wherein the named-entity recognition is performed using a model trained based on annotated training data for a specific context.

4. The system of claim 2, wherein identifying the set of sensitive entities further comprises determining a category associated with a sensitive entity of the set of sensitive entities.

5. The system of claim 4, wherein the set of replacement entities is generated based on a category associated with each sensitive entity of the set of sensitive entities.

6. The system of claim 1, wherein:

the data is obtained from a user computing device; and the set of operations further comprises providing at least a part of the deanonymized generated output to the user computing device.

7. The system of claim 1, wherein each replacement entity of the set of replacement entities comprises a category indication and an identifier.

8. The system of claim 1, wherein:

a first replacement entity of the set of replacement entities comprises a category indication and a first identifier; and a second replacement entity of the set of replacement entities comprises the category indication and a second identifier different than the first identifier.

9. A method, comprising:

processing, using a named-entity recognition model trained to identify sensitive entities associated with a specific context, data to identify a set of sensitive entities associated with the context;

processing the data to replace each sensitive entity of the set of sensitive entities with a corresponding replacement entity, thereby generating anonymized data, wherein each replacement entity comprises a category indication and an identifier, and wherein the corresponding replacement entity retains contextual information for an associated sensitive entity;

requesting, based on the anonymized data, machine learning processing by a third-party service;

obtaining, from a third-party service, generated output based on the anonymized data; and processing the generated output to replace a replacement entity of the generated output with an associated sensitive entity, thereby generating deanonymized generated output.

10. The method of claim 9, wherein:

the named-entity recognition model is a first named entity recognition model;

identifying the set of sensitive entities further comprises processing the data using a second named-entity recognition model.

11. The method of claim 10, wherein the data comprises at least one of a prompt, a context, or a short term memory associated with the machine learning processing by the third-party service.

12. The method of claim 11, wherein processing the data to replace each sensitive entity with a corresponding replacement entity comprises:

identifying a first instance of a sensitive entity and a second instance of the sensitive entity; and replacing both the first instance and the second instance with a same corresponding replacement entity.

13. A method, comprising:

processing data to identify a set of sensitive entities;

generating, based on the set of sensitive entities, a set of replacement entities, wherein the set of replacement entities retains contextual information for the set of sensitive entities;

processing the data to replace each sensitive entity of the set of sensitive entities with a corresponding replacement entity of the set of replacement entities, thereby generating anonymized data;

requesting, based on the anonymized data, machine learning processing by a third-party service;

obtaining, from a third-party service, generated output based on the anonymized data, wherein the generated output comprises a replacement entity of the set of replacement entities; and processing the generated output based on a mapping between the replacement entity and a sensitive entity of the set of sensitive entities to generate deanonymized generated output.

14. The method of claim 13, wherein the set of sensitive entities is identified using at least one of pattern matching or named-entity recognition.

15. The method of claim 14, wherein the named-entity recognition is performed using a model trained based on annotated training data for a specific context.

16. The method of claim 14, wherein identifying the set of sensitive entities further comprises determining a category associated with a sensitive entity of the set of sensitive entities.

17. The method of claim 16, wherein the set of replacement entities is generated based on a category associated with each sensitive entity of the set of sensitive entities.

18. The method of claim 13, wherein:

the data is obtained from a user computing device; and the method further comprises providing at least a part of the deanonymized generated output to the user computing device.

19. The method of claim 13, wherein each replacement entity of the set of replacement entities comprises a category indication and an identifier.

20. The method of claim 13, wherein:

a first replacement entity of the set of replacement entities comprises a category indication and a first identifier; and a second replacement entity of the set of replacement entities comprises the category indication and a second identifier different than the first identifier.

* * * * *